United States Patent [19]

Robertson

[11] Patent Number: 5,792,368
[45] Date of Patent: Aug. 11, 1998

[54] FLUIDIZED BED FILTER

[76] Inventor: Mark B. Robertson, 5610 NW. 31st Ter., Gainesville, Fla. 32653

[21] Appl. No.: 703,307

[22] Filed: Aug. 26, 1996

[51] Int. Cl.$^6$ .................................................. B01D 24/28
[52] U.S. Cl. ........................... 210/747; 210/807; 210/169; 210/416.2; 119/227; 119/259; 119/260
[58] Field of Search .................................. 210/169, 807, 210/416.2, 747; 119/227, 259, 260, 261, 262, 263, 264, 265

[56] References Cited

U.S. PATENT DOCUMENTS

| | | | |
|---|---|---|---|
| 3,381,822 | 5/1968 | Martin | 210/169 |
| 3,892,663 | 7/1975 | Wiedenmann | 210/169 |
| 4,043,936 | 8/1977 | Francis et al. | 210/11 |
| 4,582,600 | 4/1986 | Atkinson et al. | 210/151 |
| 4,894,149 | 1/1990 | Block | 210/169 |
| 5,096,814 | 3/1992 | Aivasidis et al. | 210/601 |
| 5,171,438 | 12/1992 | Korcz | 210/169 |
| 5,172,650 | 12/1992 | Hsu et al. | 119/5 |
| 5,306,421 | 4/1994 | Weinstein | 210/151 |
| 5,453,183 | 9/1995 | Hoffa | 210/150 |
| 5,527,455 | 6/1996 | Hoffa | 210/169 |
| 5,560,318 | 10/1996 | Yoshida et al. | 119/227 |
| 5,571,409 | 11/1996 | Scarborough | 210/169 |

*Primary Examiner*—Cynthia L. Nessler
*Attorney, Agent, or Firm*—Saliwanchik, Lloyd & Saliwanchik

[57] ABSTRACT

A fluidized bed filter is described and claimed. The filter is exemplified for use in an aquaculture system. A preferred embodiment of the filter of the subject invention comprises a cylinder having an inlet port. Water is pumped into the inlet port. The force of the water fluidizes the filter medium within the cylinder. Filtered water escapes the system over the open end of the cylinder.

6 Claims, 1 Drawing Sheet

FLUIDIZED BED FILTER

BACKGROUND OF THE INVENTION

Fluidized bed filters are used widely in aquaculture, water purification, and wastewater treatment. These filters can also be used in bioremediation. Under pneumatic pressure, fluidized bed filters are used to filter and treat gases, to size and separate particles, to mix powdered components, and to coat particulate substrate. The fluidized bed filters used in aquaculture are specialized biological filters which are used to remove waste products from the recirculating culture system.

Aquaculture is a term used generally to describe a variety of methods and systems for producing plants and animals in water environments. Thus, aquaculture can involve not only the cultivation of fish but also includes the cultivation of many aquatic plants and a variety of aquatic animals in addition to fish. Alligators, crawfish, frogs and seaweed are routinely cultivated by aquaculture. As the demand for healthful and exotic foods rises, aquaculture continues to expand. New species are being cultivated and advances are being made toward the increase in production of aquaculture systems. Additionally, the popularity of fresh and saltwater aquariums has enjoyed a resurgence further adding to the demand for better aquaculture systems. As used herein, the term "aquaculture" refers not only to systems for the commercial production of plants and animals, but also to consumer systems such as fresh and saltwater aquariums.

Providing for artificial cultivation of fish and other animals in populations far more dense than in nature, is a difficult prospect. Adequate food and oxygen must be supplied to the population. Further, waste must be continuously removed from the water. To maintain a supply of food and oxygen to the plant or animal population, water can be continuously pumped from a suitable source through an aquaculture system, then discharged. This, however, requires great quantities of water to maintain the system. Unfortunately, water is often a limiting factor in aquaculture. Also, the wastewater must be treated and disposed of properly. Therefore, semi-closed aquaculture systems have been developed in which water is recirculated within the system (Bullock et al., 1993). Only small amounts of new water are added periodically in a semi-closed system. Oxygen and nutrients are added to the recirculating water and waste is removed through appropriate filtration and treatment systems.

Waste can be removed from a semi-closed system by utilizing any or all of three types of "filtering" means: mechanical, chemical, and biological. Each type of filter has certain advantages with regard to the type of waste it removes most efficiently. Therefore, the filter types are often used in succession to effectively clean the recirculated water.

Particulate matter can be removed by a mechanical type filter which physically removes solid waste from the water. Mechanical filtration is often the initial step in a filtration process because particulate waste eventually breaks down and can interfere with the operation of other filters. Chemical filters typically absorb or adsorb dissolved organic compounds from the water and most often comprise an inert adsorbent such as activated charcoal.

Biological filters can remove ammonia and other metabolites from the water. Ammonia waste is of particular concern in fish aquaculture because ammonia is generated by the fish population but is toxic to the fish. Therefore, ammonia must be effectively removed from the system. In nature, ammonia waste is normally removed from water through natural processes by "ammonia-eating" bacteria. These bacteria convert ammonia to other nitrogen-containing compounds through their normal metabolic activity. Also, because of the large volume of water in nature, the concentration of ammonia is generally quite low. Fish populations in aquaculture systems are far more dense than in nature; therefore, ammonia cannot generally be adequately removed from these systems by the bacteria which naturally exist in the water. Biological filters are often used, therefore, to assist in the ammonia removal process. Biological filters can comprise bacteria which convert ammonia to other compounds. These bacteria colonize the filter media and use, as a food source, nutrients in the water. Ammonia is a primary food source for the colonizing bacteria and, by the bacterial action, ammonia waste is removed from the water.

A primary function of the biological filters is to concentrate the ammonia degrading bacteria and to allow them to proliferate. Typically, ammonia is first S metabolized to nitrite by *Nitrosomas sp.* bacteria. Nitrites are also toxic to aquatic life; however, different bacteria convert these nitrites to nitrates. For example, nitrites are converted to nitrates by *Nitrobacter sp.* bacteria. The nitrates are then converted to harmless, inert nitrogen gas by plants or anaerobic bacteria. Each of the bacterial species necessary to remove the ammonia from the system is present naturally in the water. The concentrated, enriched population of bacteria in a biological filter can efficiently and effectively remove ammonia generated by even dense populations of fish.

Currently, biological filters used in aquaculture include fluidized sand filters (Malone and Burden, 1988). A fluidized sand filter typically comprises a chamber approximately half-filled with sand. An inlet port is positioned in the center of the bottom of the chamber. The sand within the chamber is colonized by bacteria. Waste water is pumped into the system through the inlet port. The force generated by the flow of the water expands, or "fluidizes," the sand within the water-filled chamber. Water contacting the sand colonized by the bacteria is cleansed of ammonia by the action of the bacteria. Treated water leaves the system through an outlet port near the top of the chamber.

Some of the advantages of using a fluidized bed for biological filtration are as follows:

1. There is no mechanical particle capture ability in these filters, which means that they do not clog during use. This is a rather significant problem with other filtration systems. Since the media bed is fluidized and constantly moving, any particles that enter the filter ultimately pass through without becoming lodged.

2. Since a biological filter depends upon bacteria to function, it is very important to have as much surface area available for growth as possible. Fluidized bed filters have very large amounts of surface area, due to the fact that they use a fine grade of media which has high surface area for its volume.

3. What makes a fluidized bed filter especially unique is the fact that it can fully utilize all of the available media surface area, since the media bed is in constant motion. This allows the incoming water to be thoroughly mixed with the bacteria on the medium, instead of passing around it as in a fixed media filter. This method of ammonia removal is highly efficient.

BRIEF SUMMARY OF THE INVENTION

The subject invention pertains to improved fluidized bed filters. The fluidized bed filters of the subject invention are particularly effective in the removal of nitrogenous wastes from aquaculture systems. The filters of the subject invention can also be used to remove nitrogenous compounds from surface and groundwaters or soil. Similarly, the filters can be used to remove toxic compounds from environmental samples. The fluidized bed filters of the subject invention can be constructed in a wide range of sizes for use in a variety of systems, i.e., filters for use in aquaculture systems can be constructed in a size to fit a home aquarium or a large commercial system.

In a preferred embodiment, the fluidized bed filter of the subject invention comprises a hollow column (such as a cylinder) which is mounted vertically, has filter medium within the column, and has an inlet port through which water is delivered to the inside base of the column. Preferably, the column is a cylinder and is filled about half full with a filter medium. Typically, the medium can be colonized by bacteria which metabolize toxins or wastes. This medium can be, for example, sand.

When the filter of the subject invention is in use in an aquaculture system, water is pumped through an inlet port into the low end of the main cylinder. The flow of the water exerts a force sufficient to fluidize the filter medium within the cylinder. Treated water leaves the filter by flowing over the top edge (open end) of the cylinder. In a preferred embodiment, the water then flows down the side of the column. Thus, unlike current fluidized bed filter designs, there is no outlet tube which carries water back, for example, to an aquarium. Instead, the water flows over the open end of the cylinder and down the side of the cylinder.

The filter of the subject invention is typically used inside an aquarium or sump where the water can collect about the base of the filter. In a preferred embodiment, the filter is used in a sump. Water is pumped into the filter from the surrounding sump water, and water returns to the sump after exiting over the open end of the filter. Water can be returned to the aquarium from the sump by using a separate pump. In one embodiment, the filter of the subject invention further includes a pump which draws water from the sump (or other water source) and delivers the water inside the filter.

Another embodiment of the invention includes a kit wherein the filter is packaged for use by an owner of a home aquarium. A pump, such as a seven watt pump, can be packaged with the filter; the pump supplies the aquarium water to the filter when it is in use.

The filters of the subject invention have important advantages compared to existing devices. For example, the unique overflow design of these filters results in efficient heat dissipation and aeration of the water. Further, it has been discovered that the filters of the subject invention are significantly quieter than other designs.

DETAILED DESCRIPTION OF THE INVENTION

Figure 1:
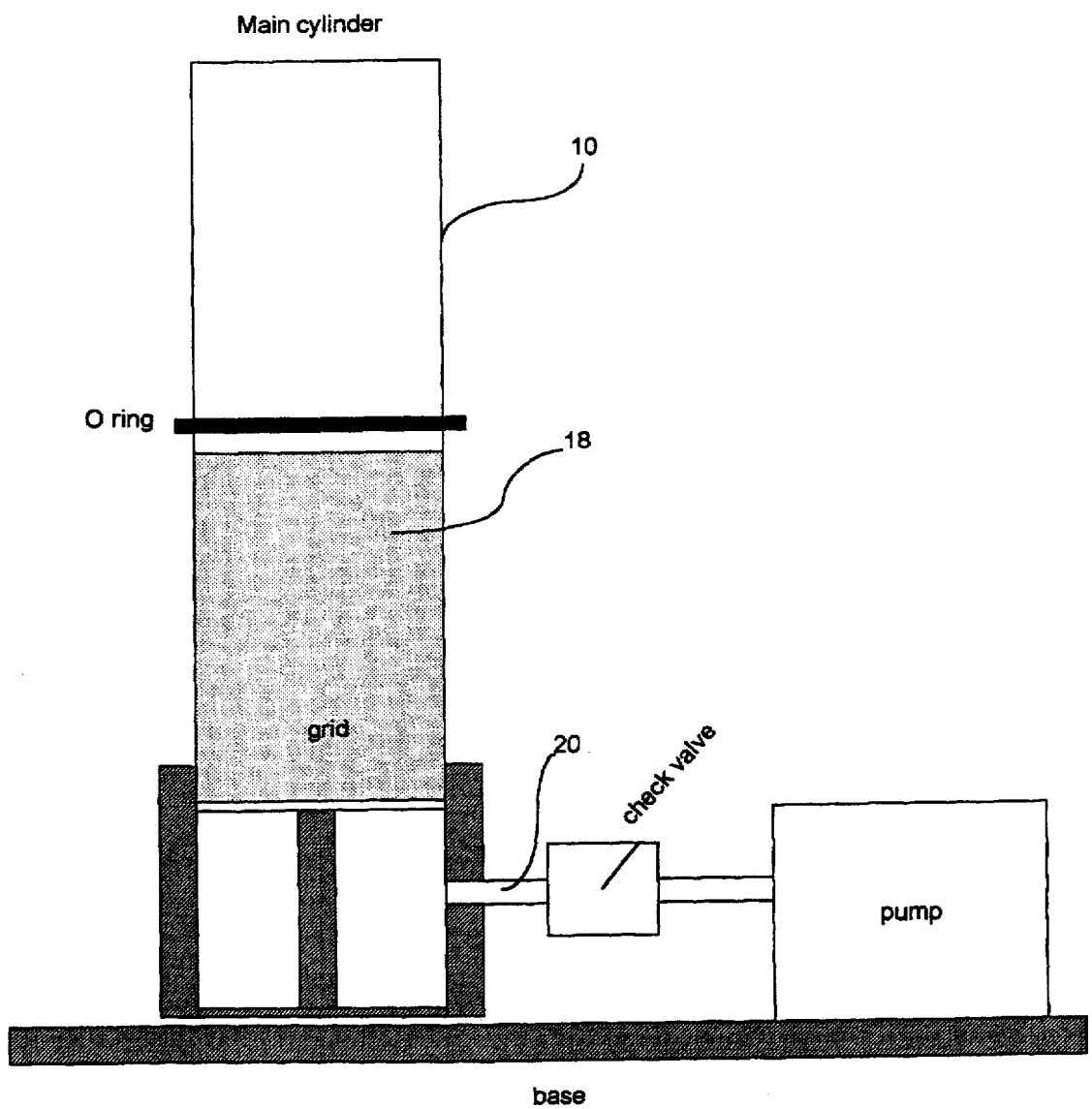
FIG. 1 is an elevational view of a preferred embodiment of the filter of the subject invention.

The subject invention pertains to an improved fluidized bed filter. In a preferred embodiment, the fluidized bed filter is designed to operate as a biological filter for the removal of ammonia and other nitrogenous wastes from a water supply. This is accomplished, for example, by the colonization of naturally occurring bacteria on the surface of the filter's medium. As water flows past the medium, the bacteria first convert ammonia into nitrite, which is then converted into nitrate by other bacteria present in the medium.

In a preferred embodiment, the filter of the subject invention is mounted vertically. In this position, water exits out the open end of the column and, preferably, flows down the sides of the column. Typically, the column will be a cylinder. Water enters the system of the subject invention from an inlet port at the base of the cylinder. The water flows up from the base into a filter medium which is typically located above the entrance port for the water. According to standard fluidized bed design, a grid or similar device can be used to support the filter medium above the inlet port. Also, the inlet port and/or the conduit bringing the water to the inlet port can be equipped with a valve to prevent backflow and movement of filter media into the conduit and/or pump.

When water enters the filter, it flows upward through the cylinder, thus expanding the filter medium. The water is treated by contacting the microbes which reside in the filter medium. Treated water exits the system by flowing out the open end of the cylinder.

The unique use of the overflow water exit design provides several important advantages compared to other systems where, for example, water exits through a tube or directly back to an aquarium. For example, the flow of water down the side of the filter serves to aerate the water. This system also efficiently dissipates heat.

Both the heat dissipation and the aeration effects of the filters of the subject invention can be modulated in a preferred embodiment of the invention which comprises a flow diffuser on the outside of the column. The flow diffuser adjusts, interrupts, or directs the flow of the water down the outside of the main column. The flow adjuster (diffuser) may be, for example, an O-ring on the outside of the cylinder. An O-ring, or similar device, is particularly advantageous because it can easily be moved along the length of the cylinder, thus enabling its use to modulate the flow precisely. For example, the O-ring can be moved to near the top of the cylinder to cause the water flow to separate from the cylinder and free-fall to the sump water surface. This increases heat dissipation and aeration. For quiet operation, the O-ring can be moved near the base of the cylinder.

In one embodiment, the water can be introduced through a hollow delivery tube as described in WO 96/11045. The introduction of water into the system through the hollow delivery tube creates a unique flow pattern within the cylinder. Because the outlet of the hollow tube is positioned only a short distance from the end cap of the cylinder and is inverted in respect thereto, water forced through the tube is deflected off the bottom of the cylinder causing a reverse flow. Advantageously, filter medium cannot settle into the hollow delivery tube.

In a preferred embodiment of the subject invention, a fluidized bed filter is shown generally in FIG. 1. The filter comprises a main cylinder 10 closed at one end by, for example, an end cap, and open at the other end. The closed end may also be mounted on a base. The inlet port 20 is at the base of the cylinder. A fine particulate filter medium is placed within the chamber 18.

In a preferred embodiment, water to be treated is pumped into the inlet port 20. When the flow rate of the water being pumped into the tube exerts sufficient force to overcome the inertia of the filter medium, the filter bed will expand, or "fluidize."

Flow rate within the system is regulated so as to provide adequate fluidization of the filter medium but to prevent flushing of the medium out of the open end of the cylinder. Flow rate can be controlled using a flow valve at the inlet port 20. This valve may take many forms. In one embodiment, the size of the entrance port may be adjustable, which can then be used to adjust flow rate. In a specific embodiment, the main cylinder can rotate inside an outer cylinder. Both cylinders have entrance ports. Flow rate is at a maximum when the entrance ports of both cylinders are aligned identically.

The main cylinder 10 of the subject invention can be of any appropriate size to facilitate adequate treatment. Thus, the size would typically depend on the flow rate needed to operate the system. The filters of the subject invention can be built to accommodate virtually any flow rate. In aquaculture systems, for example, smaller filters may be used which have a flow rate of 1 gallon per minute or less. Larger filters for commercial operations can treat 500 gallons per minute or more.

Typically, the main cylinder will be between about 6 inches and about 8 feet in length and between about 1 inch and about 4 feet in diameter.

The media used in the filters of the subject invention can be a fine particulate, usually silica or sand. The filter media must be hard enough to resist pulverization by the action of the system. The media must also have a density that permits complete fluidization at a flow rate compatible with the system. The optimal flow rate for an aquaculture biofilter is determined by the rate at which the bacteria that colonize the filter media can process ammonia waste in the water. Water at a higher flow rate is retained within the system for a shorter period of time. The "ammoniaeating" bacteria therefore are in contact with the waste for a shorter period of time. This can result in the incomplete removal of ammonia from the water. Heavy or dense particles require higher flow rates to fluidize the media and also tend to settle. Less dense particles, although requiring lower flow rates for fluidization, may be too light to hold their position within the filter and be flushed from the system. Filter media must be selected that will fluidize at a flow rate which allows adequate retention time for complete ammonia waste removal. Additionally, filter media having a round or relatively round shape provide maximum surface area on which bacteria in a biofilter can colonize. It is generally recommended in aquaculture that a surface area of about three square feet per pound of fish be provided. Maximum surface area means more bacteria per filter to process waste. In one embodiment, silica having about 36–40 square feet of surface area per pound can be used in an aquaculture biofilter at a flow rate of 1–1½ gallons per minute.

The flow rate used according to the subject invention should be sufficient to flush deposited materials from the medium. Deposits in the filter medium can cause channelling within the system. Channeling involves the buildup of material within the system which restricts the available space in which the fluidized material may circulate. As the same amount of material is forced through less space, flow within the system increases. Thus, when channeling occurs, retention time within the system is reduced. In an aquaculture biofilter, the bacteria colonizing the filter medium have less time to act upon the water. Further, filter medium that is deposited in crevices and corners no longer present all available surface area to the circulating water. Therefore, fewer bacteria are coming into contact with more water for less time. Under these circumstances, treatment of the water becomes incomplete. Bits of food and solid matter can also become trapped in channeled areas further restricting flow.

The filter of the subject invention can be constructed from a variety of materials. As exemplified, the filter is designed for use in an aquaculture system. The parts and pieces of this filter therefore should be resistant to rust and corrosion. Further, the materials from which the filter is made must be able to be sealed so that the filter is water-tight. Plastics are resistant to rust and corrosion and can be caulked with silicon or other sealants to be water-tight. Clear plastics can be used for the main cylinder to allow visual monitoring of the flow within the system. Other materials from which filter parts can be constructed include materials such as stainless steel or any material that has sufficient rigidity and tensile strength to hold the form of the filter and withstand the force of the flow rate.

The filter of the subject invention can be provided in a kit for home aquarium use. The kit can comprise the fluidized bed filter and a pump, such as a seven watt pump commonly used in aquarium systems. The pump provides the filter with an adequate flow rate of aquarium water to fluidize the filter bed. The kit can further comprise a mechanical, sponge-type filter to be placed in line before the fluidized filter to remove particulate waste.

A person skilled in the art having the benefit of the disclosure provided here could readily adapt the fluidized bed filter of the subject invention for use in removal of toxins and wastes from environmental samples such as water and soil samples, and mine tailings. These toxins and wastes may be, for example, cyanide, ammonia and other nitrogenous wastes, and hydrocarbons. Endogenous bacteria can be used, or the bed can be inoculated with specific bacteria. Bacteria which degrade specific compounds or classes of compounds are well known in the art and are readily available. See, for example, U.S. Pat. Nos. 4,833,086; 5,132, 224; 5,221,327; 5,242,825; 5,248,329; 5,283,192; 5,413, 624; and 5,422,268.

Following is an example which illustrates procedures for practicing the invention. This example should not be construed as limiting.

EXAMPLE 1
Operation of the Fluidized Bed Filter

1. The water to be filtered is pumped into the cylinder by means of an external pump.

2. The water enters the cylinder and rises through the filter medium in the main cylinder and exits via the open end of the cylinder.

3. By increasing the flow through the filter medium, the inertia of the water will overcome the density of the medium, causing the filter bed to expand and fluidize.

4. The percentage of medium expansion is controlled by regulating the water flow.

5. The flow rate should be kept low enough to prevent flushing the medium out of the filter.

It should be understood that the examples and embodiments described herein are for illustrative purposes only and that various modifications or changes in light thereof will be suggested to persons skilled in the art and are to be included within the spirit and purview of this application and the scope of the appended claims.

REFERENCES

Bullock, G., J. Hankins, J. Heinen, C. Starliper, J. Teska (1993) "Qualitative and Quantitative Bacteriological Studies on a Fluidized Sand Biofilter Used in a Semiclosed Trout Culture System," *Biological Report* 17, July.

Malone, R. F., D. G. Burden (1988) *Design of Recirculating Soft Crawfish Shedding Systems*, Louisiana Sea Grant College, Baton Rouge, La.

I claim:

1. A method for filtering an aqueous material in an aquaculture system wherein said method comprises introducing said material into a fluidized bed filter comprising (a) a main hollow column having one closed end forming a chamber with one open end;
   (b) an inlet port at the base of said chamber;
   (c) filter medium disposed above said inlet port within said chamber;
   (d) pump means connected to said inlet port for directing said aqueous material through said filter medium, through said open end and down the outside of said column, said pump means further defining means for fluidizing said filter medium; and
   (e) an O-ring disposed on the outside of said column, said O-ring defining means for modulating the flow of said aqueous material as said aqueous material flows down the outside of said column.

2. The method, according to claim 1, wherein said filter further comprises a flow valve at said inlet port.

3. The method, according to claim 2, wherein said flow valve comprises two cylinders which can be rotated with respect to each other to align the inlet port.

4. In an aquaculture system, the system comprising a filter for filtering aqueous material, the improvement comprising a fluidized bed filter comprising:

(a) a main hollow column having one closed end forming a chamber with one open end;
   (b) an inlet port at the base of said chamber;
   (c) filter medium disposed above said inlet port within said chamber;
   (d) pump means connected to said inlet port for directing said aqueous material through said filter medium, through said open end and down the outside of said column, said pump means further defining means for fluidizing said filter medium; and
   (e) an O-ring disposed on the outside of said column, said O-ring defining means for modulating the flow of said aqueous material as said aqueous material flows down the outside of said column.

5. The filter, according to claim 4, further comprising a flow valve at said inlet port.

6. The filter, according to claim 5, wherein said flow valve comprises two cylinders which can be rotated with respect to each other to align the inlet port.

* * * * *